March 13, 1951 N. P. MILLAR 2,545,369
HALL EFFECT FREQUENCY METER
Filed March 9, 1949 2 Sheets-Sheet 1

Inventor:
Norval P. Millar,
by *Harrell S. Mack*
His Attorney.

March 13, 1951   N. P. MILLAR   2,545,369
HALL EFFECT FREQUENCY METER
Filed March 9, 1949   2 Sheets-Sheet 2

Inventor:
Norval P. Millar,
by Bravell S. Mack
His Attorney.

Patented Mar. 13, 1951

2,545,369

UNITED STATES PATENT OFFICE 2,545,369

HALL EFFECT FREQUENCY METER

Norval P. Millar, Danvers, Mass., assignor to General Electric Company, a corporation of New York Application March 9, 1949, Serial No. 80,532

6 Claims. (Cl. 175—368)

My invention relates to frequency responsive apparatus utilizing the Hall effect, and its object is to provide a frequency meter of low cost and simple construction having no moving parts other than a sensitive direct current measuring instrument.

In carrying my invention into effect, I utilize Hall effect apparatus and energize such apparatus from the alternating current source whose frequency is to be measured through parallel circuits which have different frequency response characteristics, such that the resultant Hall effect output is a direct current voltage whose polarity or magnitude or both vary with frequency. I may employ a device having a pair of Hall plates having either their field or current input circuits or both such circuits connected in parallel frequency response circuits, such that the differential output voltage is a measure of the frequency; or I may employ a single Hall plate device having a differential and frequency sensitive circuit energizing arrangement and a direct current voltage output which is a measure of the frequency.

Figure 5:
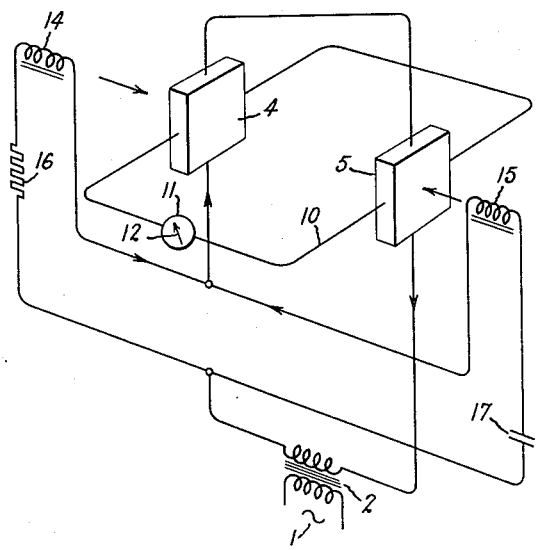
Figure 2:
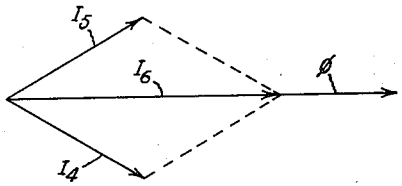
Figure 3:
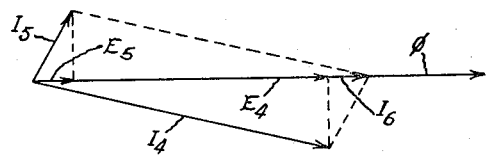
Figure 4:
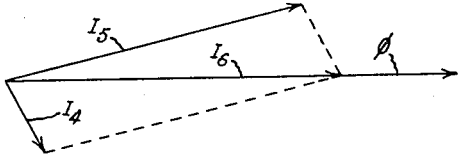
Figure 6:
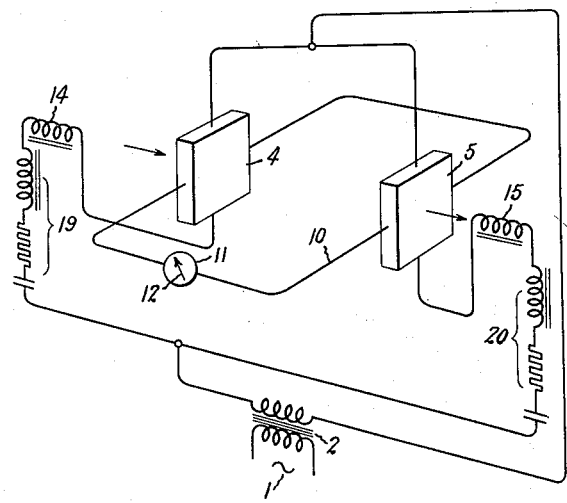
Figure 8:
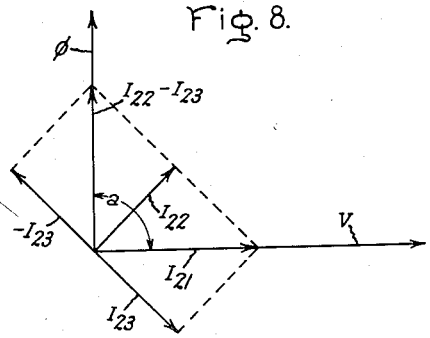
Figure 9:
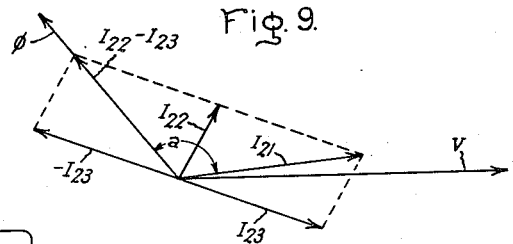
Figure 7:
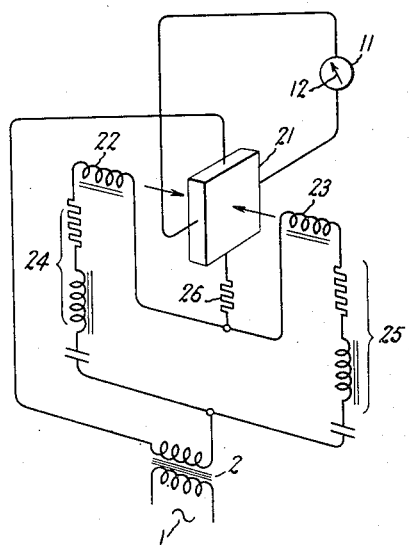
Figure 10:
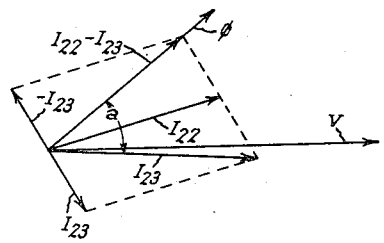

The features of my invention which are believed to be novel and patentable will be pointed out in the claims appended hereto. For a better understanding of my invention reference is made in the following description to the accompanying drawing showing in Fig. 1 an embodiment of my invention where the current input circuits of the Hall plates are connected in frequency sensitive parallel circuits. Figs. 2, 3, and 4 are vector diagrams explanatory of the operation of the instrument of Fig. 1. Fig. 1a shows the preferred structure of field for Fig. 1. Fig. 5 is an embodiment where the fields of the Hall plates are separate and in separate circuits made frequency sensitive. Fig. 6 is an embodiment of my invention where both the field and input current circuits of the two Hall plates are made frequency sensitive. Fig. 7 represents an embodiment of my invention using a single Hall plate, and Figs. 8, 9, and 10 are vector diagrams explanatory of Fig. 7.

Figure 1:
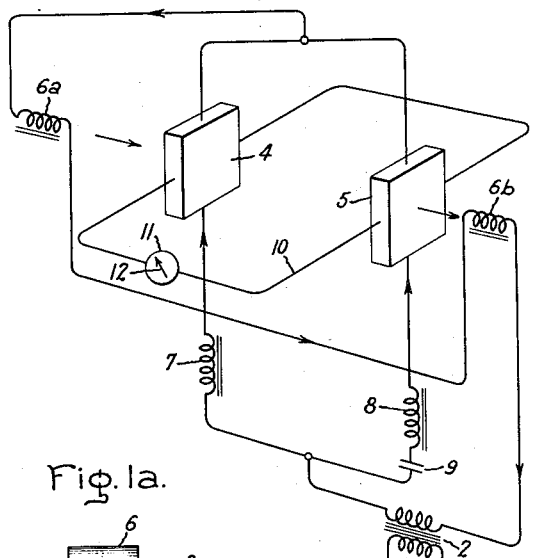
Figure 1A:
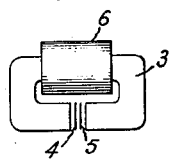

Referring now to Figs. 1 and 1a, I represents a source of alternating current voltage assumed to be subject to a frequency variation of, for example, from 55 to 65 cycles, and the exact frequency at any instant is to be measured by the use of my invention. Two (2) represents a transformer of the saturable core type such that its secondary voltage remains constant for expected variations in voltage of the source 1, and such that the secondary voltage is of a magnitude suitable for the energization of my frequency meter. Where the voltage is not subject to variation and is of the desired magnitude, such voltage regulating means may be omitted. Also other types of voltage regulations may be used. At 3 in Fig. 1a, is a magnetic circuit containing an air gap in which two Hall plates 4 and 5 are located. A winding 6 is provided on the magnetic circuit for forcing a flux across the gap and through the Hall plates 4 and 5. A Hall plate is a small plate of a material which exhibits the Hall effect. Thus when a flux is passed through the plate at right angles to its plane and a current is passed through it from end to end along one axis, a voltage appears across the edges of the plate at right angles to the flux and current axes, which voltage is proportional to the product of the flux and energizing current. If the flux and energizing current are alternating and of the same frequency, the output voltage will be a direct current voltage proportional to the inphase components of flux and energizing current. For explanation purposes the device of Fig. 1a may be represented as in Fig. 1, where the magnetic circuit is not fully represented and the winding 6 is divided into two separate coils designated 6a and 6b. In Fig. 1 the Hall plates 4 and 5 are connected in parallel and this parallel connection is connected in series with the field coils 6a and 6 b, and this circuit energized from the source of frequency to be metered through the transformer 2.

In the current circuit of Hall plate 4 is an inductance 7 and in the circuit of Hall plate 5 is an impedance consisting of an inductance 8 and a condenser 9. The elements 7, 8 and 9 are so chosen or adjusted that at a given frequency, say, at 60 cycles the primary energizing currents of the Hall plates are equal or approximately equal and have equal or approximately equal inphase components with respect to the field flux of the device as represented in Fig. 2, where $I_4$ represents the magnitude and phase angle of the energizing current of Hall plate 4, $I_5$ represents the magnitude and phase angle of the energizing current of Hall plate 5, and $I_6$ the vector sum or current through field coil 6, Fig. 1a, or 6a and 6b, Fig. 1. The field flux may be represented by an arrow $\phi$ in phase with and proportional to $I_6$. When the frequency decreases, the vector relations change in the manner indicated in Fig. 3, the current through Hall plate 4 and its inphase component increasing and that through Hall plate 5 and its inphase component decreasing. When the frequency increases above the corresponding value to Fig. 2, the vector relation may be as represented in Fig. 4. The frequency response elements 7, 8, and 9 are so chosen or adjusted as to provide a satisfactory differential response between the inphase components of $I_4$ and $I_5$ over the frequency range to be measured.

The inphase components of $I_5$ and $I_4$ and the field flux $\phi$ produce proportionate voltages across the output terminals of the Hall plates which we may designate $E_4$ and $E_5$. In Fig. 2, $E_4$ and $E_5$ will be equal and will be proportional to the projection of $I_4$ and $I_5$ on the flux vector $\phi$. In Fig. 3, $E_4$ will have increased and $E_5$ decreased, and in Fig. 4 the reverse will be true.

The output voltage terminals of the Hall plates 4 and 5 of the device are connected in opposing relation in series by a circuit 10 to a sensitive direct current measuring instrument 11. This millivoltmeter may have a permanent magnet field and have its pivoted armature coil energized in response to the difference in the output voltage, if any, in the two Hall plates 4 and 5. Also, the instrument 11 will in this case be of the zero center type such that when receiving no armature energizing current, at the mid-frequency range corresponding to Fig. 2, its pointer 12 stands at midscale. It deflects to the left for lower frequencies and to the right for higher frequencies. The scale of the instrument may then be calibrated in terms of the frequency of the circuit 1 from 55 to 65 cycles, for example on the right of zero and from 45 to 55 on the left of zero. For a longer range of frequency measurement the frequency response elements 7, 8, and 9 would be made less sensitive to changes in frequency.

It is evident that this type of instrument has inherently high sensitivity because the response due to energizing current differential of the Hall plates and the response due to changes in phase angle between the Hall plate energizing currents and the field flux are in adding relation as shown in Figs. 3 and 4. It is also noted that at the zero center condition represented in Fig. 2 the instrument would have no voltage error even if no voltage regulating device, such as the saturable core transformer 2, were provided because where $E_4$ and $E_5$ are equal, then actual values are immaterial. The differential voltage principle employed will tend to reduce voltage errors at other points of the scale. It is of course obvious that the apparatus could be tuned and calibrated to employ a D.-C. millivoltmeter at 11 having its zero at one end of the scale and range of frequency measurement.

In Fig. 5 the parts similar to those of Fig. 1 are represented by like reference characters. In Fig. 5 the Hall plates 4 and 5 must have separate field magnets, the coils of which are indicated by reference characters 14 and 15, and these coils together with suitable frequency response circuit elements 16 and 17 are connected in parallel, and this parallel circuit connected in series with the input current circuits of Hall plates 4 and 5, and the complete circuit energized from the source of frequency 1 to be measured through the voltage regulating transformer 2. The principle of operation is essentially the same as in Fig. 1 except that in Fig. 5 the magnitude and phase relation of the field flux of the two Hall plates vary with respect to each other while the energizing current through the Hall plates corresponds to the vector sum of the field currents. The frequency sensitive elements 16 and 17 will in general be somewhat different than the corresponding element 7, 8 and 9 of Fig. 1, because in Fig. 5 the field coils 14 and 15 furnish appreciable inductance in the frequency response circuits. Thus the impedance element at 16 in Fig. 5 might be primarily a noninductive resistance.

In Fig. 5 the fields indicated by arrows adjacent the field coils 14 and 15 are represented as being in reverse directions. The inphase energizing current components in the two Hall plates will be in reverse directions at any instant for the connections shown so that the voltages at the near output terminals of the Hall plates will be of the same polarity. Hence, these voltages are connected in bucking relation in the circuit of millivoltmeter 11 by the connections represented. In any case a change in this output voltage polarity relation may be changed by reversing one field coil or one input current circuit. In Fig. 1 the field fluxes are in the same direction and the effective current components are in the same direction at any instant; hence, the differential voltage output circuit will be connected the same as in Fig. 5.

In Fig. 6 both the Hall plate 4 and its field coil 14 are connected in one circuit with a suitable frequency sensitive impedance 19, while Hall plate 5 and its field coil 15 are connected in another circuit with a different suitable frequency sensitive impedance 20, and both circuits are supplied from the source of frequency to be measured 1 through the voltage regulator 2. Here one impedance, such as 19, will produce a decrease in current in its circuit, while the other impedance 20 will produce an increase in current in its circuit for the same change in frequency within the measurement range. While the field input current of a given Hall plate will remain in the same phase relation, both the field and input current magnitude of such plate will change in the same direction with a given change in frequency, and hence, by proper selection of the circuit constants high sensitivity may be obtained.

In Fig. 7, I employ a single Hall plate 21 and obtain the differential result by employing two fields for such plate which may be considered as opposing each other. The field coils represented at 22 and 23 both produce flux through the same Hall plate but since these fields are opposed, it will be the differential field or, more correctly, the vectorial differential field which is effective in producing the Hall effect, if any. The parallel field circuit portions of the energizing system include frequency sensitive impedances 24 and 25 which have suitable different frequency response characteristics for the range of frequency measurement range contemplated. At the mid-frequency measurement range the vector relations for the device of Fig. 7 may be as represented in Fig. 8 where $I_{22}$ represents the leading current of field winding 22, and $I_{23}$ lagging current of field winding 23. The primary or input current of the Hall plate 21 will then be the vector sum of the field currents or $I_{21}$. Vector V may represent the phase position of the supply voltage. As pointed out above, the field windings are opposed, and hence, the resultant field through Hall plate 21 will be proportional to and have a vector position corresponding to the vector difference of the field currents $I_{22}$ and $I_{23}$. $-I_{23}$ represents $I_{23}$ reversed, and combined with $I_{22}$ gives the resultant $I_{22} - I_{23}$, and the resultant field produced may be represented by the vector $\phi$ in phase with and proportional to the differential field resulting from $I_{22} - I_{23}$.

Under the conditions assumed, the Hall plate D.-C. voltage output will be zero because the resultant field $\phi$ through the Hall tplate is 90 degrees (angle $a$) out of phase with the resultant input current $I_{21}$ through the Hall plate. Hence, the zero-center D.-C. instrument 11 will read zero at midscale and this point will be marked with the frequency that results in the vector relations of Fig. 8. While this 90-degree angle $a$ is represented as resulting from equal field currents and a Hall plate current in phase with the line voltage, it might result from unequal field currents and correspondingly different vector relations and circuit constants. Assuming now the frequency drops below the value corresponding to Fig. 8, the vector relations will change and at some such lower frequency will be as represented in Fig. 9. The angle $a$ in Fig. 9 is greater than 90 degrees and a D.-C. output voltage will result which will be proportional to $\phi I_{21} \cos a$, and will be negative, causing the instrument 11 to deflect to the left of center.

When the frequency increases above the mid-scale value, the vector relations will change accordingly and at some such higher value may be represented as in Fig. 10. Here, angle $a$ is less than 90 degrees and the D.-C. voltage output will be proportional to $\phi I_{21} \cos a$, and will be positive, causing the instrument 11 to deflect to the right of zero center. Thus the instrument 11 may be calibrated with the apparatus and circuit constants selected in terms of frequency, and the Hall plate device as thus used becomes a highly sensitive low-cost frequency responsive or measuring device.

In all cases of commercial frequency measurement the field windings will be wound on well laminated magnetic core material for best efficiency, and where possible, as in the case of Figs. 1 and 7, the field coil or coils will be wound on a single nearly closed magnetic circuit, such as is represented in Fig. 1a, with the Hall plate or plates in the air gap. Figs. 5 and 6 require two separate magnet circuits, such as are represented in Fig. 1a.

While I do not wish to be limited to any particular set of specifications for the Hall plate frequency measuring devices described, it may be helpful to mention one set of practicable specifications that was used with experimental apparatus with good results. For apparatus such as is represented in Fig. 7 having a 55-65 cycle measurement range and an energizing voltage of 120 volts, the following have been found satisfactory:

The field coils 22 and 23 each had 1400 turns of 11.3 mil copper wire. These were wound on a magnetic circuit of laminated silicon steel having a cross section approximately equal in size and shape to the face of the germanium Hall plate used, the Hall plate having a dimension of ¼"×¼"×0.025" thick. A 60-ohm zero-center milliammeter having a full scale current of 0.85 ampere was used at 11. The impedance 24 employed an inductance of 5.3 henrys and a 0.75 microfarad condenser, and this branch circuit had a resonant frequency of 80 cycles. The impedance 25 used an inductance of 7.7 henrys and a 2.0 microfarad condenser and had a resonant frequency of 41 cycles.

*Performance*

|  | $I_{22}$ | $I_{23}$ | $I_{21}$ | $I_{23}-I_{22}$ | Cos a |
|---|---|---|---|---|---|
|  | Amperes | Amperes | Amperes | Amperes |  |
| At 55 cycles | 0.057 | 0.09 | 0.06 | 0.138 | −0.582 |
| At 60 cycles | 0.073 | 0.073 | 0.05 | 0.137 | 0 |
| At 65 cycles | 0.097 | 0.060 | 0.068 | 0.147 | +0.583 |

It is to be noted that both the variation in current and the variation in phase angle are utilized in an additive sense in obtaining frequency sensitivity, and that a contributing factor to high sensitivity is the utilization of both positive and negative outputs of the Hall plate device.

In cases where the apparatus is to be used under circumstances where there is likely to be a considerable variation in temperature, it may have a temperature error unless compensation is made therefor. Both the measuring instrument 11 and the Hall plate or plates may have temperature errors which tend to cause the instrument 11 to read low on high tempertaures. One feasible way of compensating for such over-all error is to include some series circuit resistance which has a negative temperature coefficient of resistance. The resistance represented at 26 in Fig. 7 having a negative temperature coefficient of resistance is intended for this purpose.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Frequency measuring apparatus comprising a Hall plate device, field producing means for said device, current input terminals for said device and circuits for energizing said field producing means and current input terminals from an alternating current source the frequency of which is to be measured such that a direct current output voltage is produced by said device, said energizing circuits having parallel branches having different frequency response characteristics, and a direct current measuring instrument energized by the output voltage of said device and calibrated with such device in terms of input frequency.

2. Frequency measuring apparatus comprising a Hall plate device, field producing means for said device, current input terminals for said device, connections for energizing said field producing means and current input terminals from an alternating current source the frequency of which is to be measured, said connections forming a circuit a portion of which has parallel branches and another portion of which is connected in series with the parallel branch portion, one of said circuit portions energizing field producing means and the other portion energizing the current input terminals of said Hall plate device, means included in the parallel branches for causing said branches to have different frequency response characteristics such that the magnitude and phase angle of the currents in the parallel branches vary with respect to each other with changes in frequency, and a direct current instrument energized in response to the output voltage of said Hall plate device and calibrated with said apparatus in terms of input frequency.

3. Frequency measuring apparatus comprising a magnetic circuit having an air gap, a Hall plate located in said air gap so as to be cut by the flux of said magnetic circuit, a pair of windings on said magnetic circuit, circuit connections connecting said windings in opposition in parallel energizing circuits and the parallel circuits in series with said Hall plate to a source of alternating current voltage the frequency of which is to be measured, said parallel circuits being differentially responsive to frequency changes, and a direct current instrument connected to be energized by the output voltage of said Hall plate.

4. Frequency measuring apparatus comprising a magnetic circuit containing an air gap, a Hall plate within said gap so as to be cut by the flux of said magnetic circuit, a pair of windings on said magnetic circuit, circuit connections connecting said windings in opposition in parallel energizing circuits and such parallel circuits in series with the Hall plate to a source of alternating current voltage the frequency of which is to be measured, one of said parallel circuits being resonant at a frequency above that to be measured and the other parallel circuit being resonant at a frequency below that to be measured, and a zero-center direct current instrument connected to be energized by the output voltage of said Hall plate, said Hall plate having a direct current output voltage which varies from a negative value through zero to a positive value as the energizing voltage frequency is varied over the measurement range and said instrument being calibrated with the apparatus to indicate the value of the energizing frequency over such range.

5. Frequency responsive apparatus comprising a pair of Hall plates, an electromagnet for each Hall plate for producing a flux therethrough, current input and voltage output terminals for said Hall plates, circuit connections for connecting said electromagnets in parallel energizing circuits and such parallel circuits in series with both Hall plates through their input current terminals and to an alternating current source the frequency of which is to be measured, a direct current measuring instrument and an output circuit for connecting the output terminals of said Hall plates in opposition to said instrument, and frequency responsive impedance means in each of said parallel circuits, one serving to produce an increase in the output of its corresponding Hall plate and the other serving to produce a decrease in output of its corresponding Hall plate in response to an increase in frequency over the frequency measurement range.

6. Frequency measuring apparatus comprising a pair of Hall plates, an electromagnet for producing a flux through both of said plates, input current terminals and output voltage terminals for said plates, circuit connections for connecting the Hall plates in parallel energizing circuits through their input terminals and such parallel circuits in series with said electromagnet and to a source of alternating current the frequency of which is to be measured, a direct current measuring instrument and circuit connections for connecting the output terminals of said Hall plates in opposition to said instrument, and frequency sensitive impedance means in both of the parallel energizing circuits for varying the magnitude and phase angle of the currents in such parallel circuits in response to changes in frequency, one such impedance serving to increase the output of its corresponding Hall plate and the other impedance serving to decrease the output of its corresponding Hall plate in response to an increase in frequency over the range to be measured, the outputs of said two Hall plates being made equal at one point within such range.

NORVAL P. MILLAR.

REFERENCES CITED

The following references are of record in the file of this patent:

UNITED STATES PATENTS

| Number | Name | Date |
|---|---|---|
| 1,156,491 | Price | Oct. 12, 1915 |
| 1,778,795 | Craig | Oct. 21, 1930 |